US007251599B2

(12) United States Patent
Maison et al.

(10) Patent No.: US 7,251,599 B2
(45) Date of Patent: Jul. 31, 2007

(54) AUTOMATIC CONSTRUCTION OF UNIQUE SIGNATURES AND CONFUSABLE SETS FOR DATABASE ACCESS

(75) Inventors: Benoit Maison, White Plains, NY (US); Geoffrey G. Zweig, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/315,411

(22) Filed: Dec. 10, 2002

(65) Prior Publication Data

US 2004/0111262 A1 Jun. 10, 2004

(51) Int. Cl.
*G10L 15/02* (2006.01)
(52) U.S. Cl. .................................................. 704/251
(58) Field of Classification Search ................ 704/251
See application file for complete search history.

(56) References Cited

U.S. PATENT DOCUMENTS 5,907,839 A * 5/1999 Roth ............................. 707/5
6,327,656 B2 * 12/2001 Zabetian ..................... 713/176

* cited by examiner

*Primary Examiner*—Susan McFadden
(74) *Attorney, Agent, or Firm*—Ference & Associates LLC

(57) ABSTRACT

Methods and arrangements for facilitating database access in speech recognition. A plurality of possible subsequences corresponding to a database entry are ascertained, a record of such subsequences and their correspondence to database entries is created, and either or both of the following are carried out: unique signatures are ascertained via determining whether a subsequence corresponding to a given database entry does not also correspond to at least one other database entry; and/or multiple occurrences of a given subsequence are found, with corresponding database entries being grouped into a confusion set.

19 Claims, 5 Drawing Sheets

```
<S> ::=
3-L HAIR WORLD? ON? NORTH? 3RD? STREET? : 1
3-L HAIR? WORLD? ON? NORTH 3RD? STREET? : 1
3-L HAIR? WORLD ON? NORTH? 3RD? STREET? : 1
3-L? HAIR WORLD? ON? NORTH 3RD? STREET? : 1
SUZIE'S? HAIR WORLD? ON? MAIN STREET? : 2
SUZIE'S HAIR WORLD? ON? MAIN? STREET? : 2
SUZIE'S HAIR?  WORLD ON? MAIN? STREET? : 2
SUZIE'S? HAIR? WORLD ON? MAIN STREET? : 2
```

```
<S> ::=
3-L HAIR WORLD? ON? NORTH? 3RD? STREET? : 1
3-L HAIR? WORLD? ON? NORTH 3RD? STREET? : 1
3-L HAIR? WORLD ON? NORTH? 3RD? STREET? : 1
3-L? HAIR WORLD? ON? NORTH 3RD? STREET? : 1
SUZIE'S? HAIR WORLD? ON? MAIN STREET? : 2
SUZIE'S HAIR WORLD? ON? MAIN? STREET? : 2
SUZIE'S HAIR?  WORLD ON? MAIN? STREET? : 2
SUZIE'S? HAIR? WORLD ON? MAIN STREET? : 2
HAIR WORLD=CO.
```

FIG. 5

AUTOMATIC CONSTRUCTION OF UNIQUE SIGNATURES AND CONFUSABLE SETS FOR DATABASE ACCESS

FIELD OF THE INVENTION

The present invention relates generally to database access in text or speech recognition.

BACKGROUND OF THE INVENTION

In database applications associated with text or speech recognition (e.g., text typed in, or speech uttered by, a user), the ability to quickly find records that match a user's query is of critical importance. For example, a database record might include a customer's first, middle and last name, address, phone number, and the last amount spent. The user of a database will in general want to retrieve records that match some query, for example, "John Doe," "John Doe on North Street," and so forth. When the queries are constrained to be simple, for example "Address=1412 Main Street", and exact matches are adequate, hashing techniques allow for fast database access.

The problem is significantly more difficult when the records are long and unstructured, and the potential queries are unconstrained. A good example of this occurs in directory assistance applications, where the database is the phonebook, and there are numerous ways for a customer to ask for a listing.

For example, if an entry for "3-L Hair World" (located on North 3rd Street) is in the database, a person might ask for it in many ways, e.g.
"3-L"
"Hair World"
"Hair World on 3rd Street"

Further, the database might also include an entry for "Susie's Hair World" (located on Main Street). In this case, if a person asks for "Hair World" there is an ambiguity—no listing is uniquely identified.

In view of the foregoing, a need has been recognized in connection with facilitating database access in situations where such access might normally prove to be elusive or difficult.

SUMMARY OF THE INVENTION

The following problems are broadly addressed herein:
precomputing numerous possible ways that a person might ask for a record, where each way uniquely identifies the record; and
precomputing the sets of records that match non-unique partial specifications.

To continue with the example described above, at least one embodiment of the present invention preferably involves the identification of utterances or queries that uniquely identify a listing—e.g.:
"3-L"
"3-L Hair World"
"Susie's"
"Susie's Hair World"
"Hair World on 3rd Street"
"Hair World on Main Street"

Each of these unambiguously identifies a single listing. In the case of directory information, the associated phone number can be given to the caller.

At least one embodiment of the present invention also preferably involves the identification both of phrases that might refer to several listings and of what those listings are. For example, the phrase "Hair Care" could refer to either 3-L or Susie's. If a user says "Hair Care", the automated system could conceivably say, "There are two listings that match, 3-L and Susie's. Which would you like?"

In commercial applications such as directory assistance, it is very important to be able to quickly recognize whether the customer has given enough information to uniquely identify a listing. When this is the case, the customer can be given the requested phone number automatically, and without further questioning. Otherwise, further information may be required. Speeding the time of this determination is economically beneficial because it directly reduces the amount of money that must be spent on computer equipment (fewer computers can handle more calls), and reduces the amount of money that must be spent keeping the phone line open.

Accordingly, there are broadly contemplated herein methods for creating a database representation of complex records in such a way as to allow the immediate determination of whether a query provides enough information to determine a unique record, and if not, what the subset of matching records is. There are also contemplated herein methods for constructing a speech-recognition grammar that can be used to retrieve records when queries are made verbally, and for querying the database with word sequences derived from a language-model based speech recognizer.

In summary, one aspect of the invention provides a method of facilitating database access in speech recognition, the method comprising the steps of: ascertaining a plurality of possible subsequences corresponding to a database entry; creating a record of such subsequences and their correspondence to database entries; and at least one of: ascertaining unique signatures via determining whether a subsequence corresponding to a given database entry does not also correspond to at least one other database entry; and finding multiple occurrences of a given subsequence and grouping corresponding database entries into a confusion set.

A further aspect of the invention provides an apparatus for facilitating database access in speech recognition, the apparatus comprising: an arrangement for ascertaining a plurality of possible subsequences corresponding to a database entry; an arrangement for creating a record of such subsequences and their correspondence to database entries; and at least one of: an arrangement for ascertaining unique signatures via determining whether a subsequence corresponding to a given database entry does not also correspond to at least one other database entry; and an arrangement for finding multiple occurrences of a given subsequence and grouping corresponding database entries into a confusion set.

Furthermore, an additional aspect of the invention provides a program storage device readable by machine, tangibly embodying a program of instructions executable by the machine to perform method steps for facilitating database access in speech recognition, the method comprising the steps of: ascertaining a plurality of possible subsequences corresponding to a database entry; creating a record of such subsequences and their correspondence to database entries; and at least one of: ascertaining unique signatures via determining whether a subsequence corresponding to a given database entry does not also correspond to at least one other database entry; and finding multiple occurrences of a given subsequence and grouping corresponding database entries into a confusion set.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 5 shows the sample grammar of FIG. 2, but with confusion sets added.

DESCRIPTION OF THE PREFERRED EMBODIMENTS

Very generally, at least one presently preferred embodiment of the present invention involves a process for representing a database with a set of lexical unique signatures and confusion sets. This representation has the property that a user may request an item in the database using a partial specification of the item's properties. If the partial specification is enough to uniquely identify a single item, that item is returned. Otherwise, the complete set of partial matches is returned. This procedure can be used in at least the following ways:

to process text-based queries of a database;
;o process verbal queries of the database
to build a speech recognition grammar to recognize verbal queries and return appropriate database records, involving one or more of the following:
processing the output of a language-model based recognizer
processing the output of a grammar-based recognizer
to perform either task in conjunction with confidence-based weighting of the words present in the output of either a language-model or grammar-based recognizer;
in a recursive or iterative fashion, dynamically building grammars that iteratively narrow down the set of possible database matches.

Figure 1:
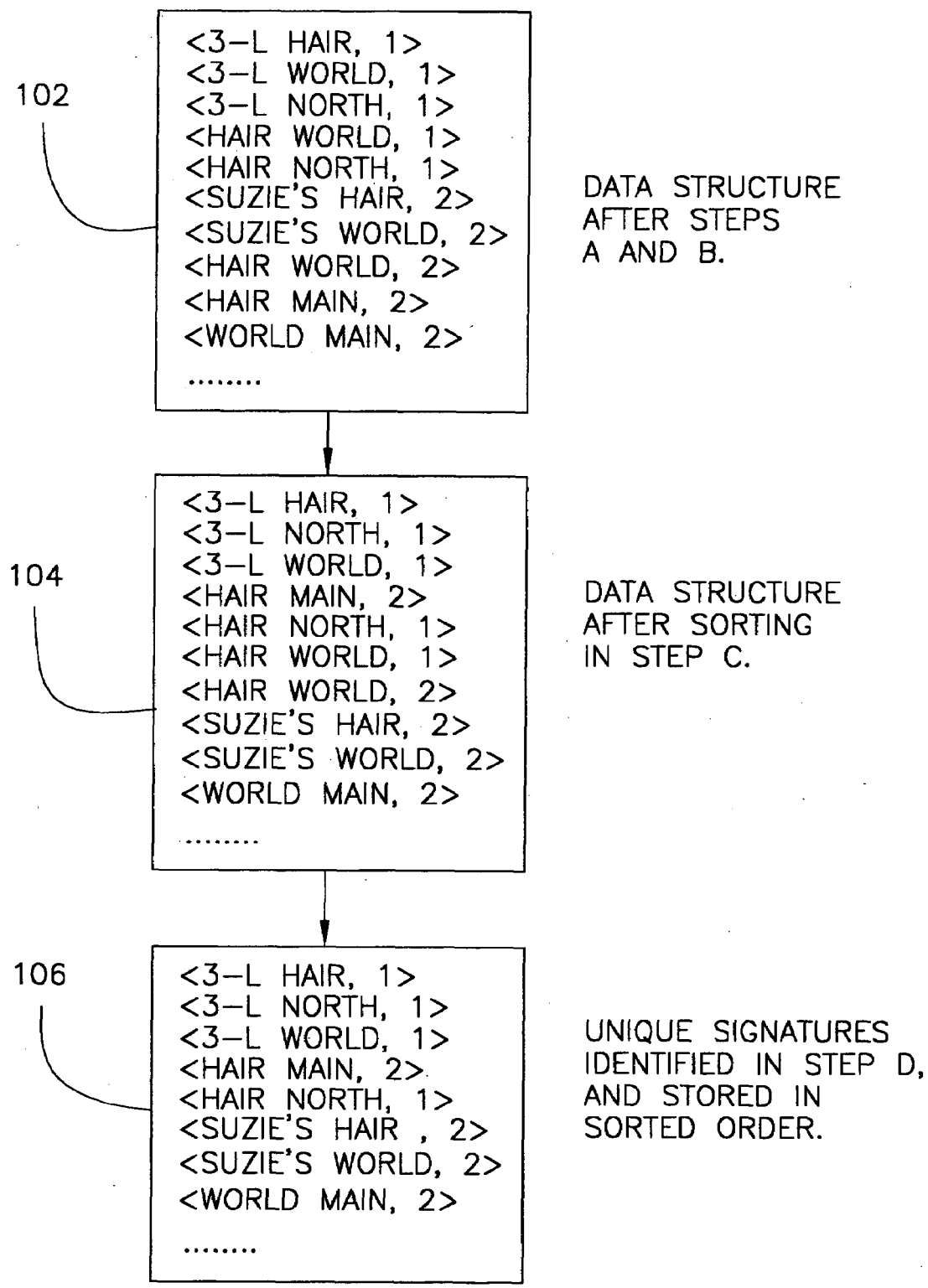
FIG. 1 is a flow diagram representing the construction of unique signatures.
Figure 1A:
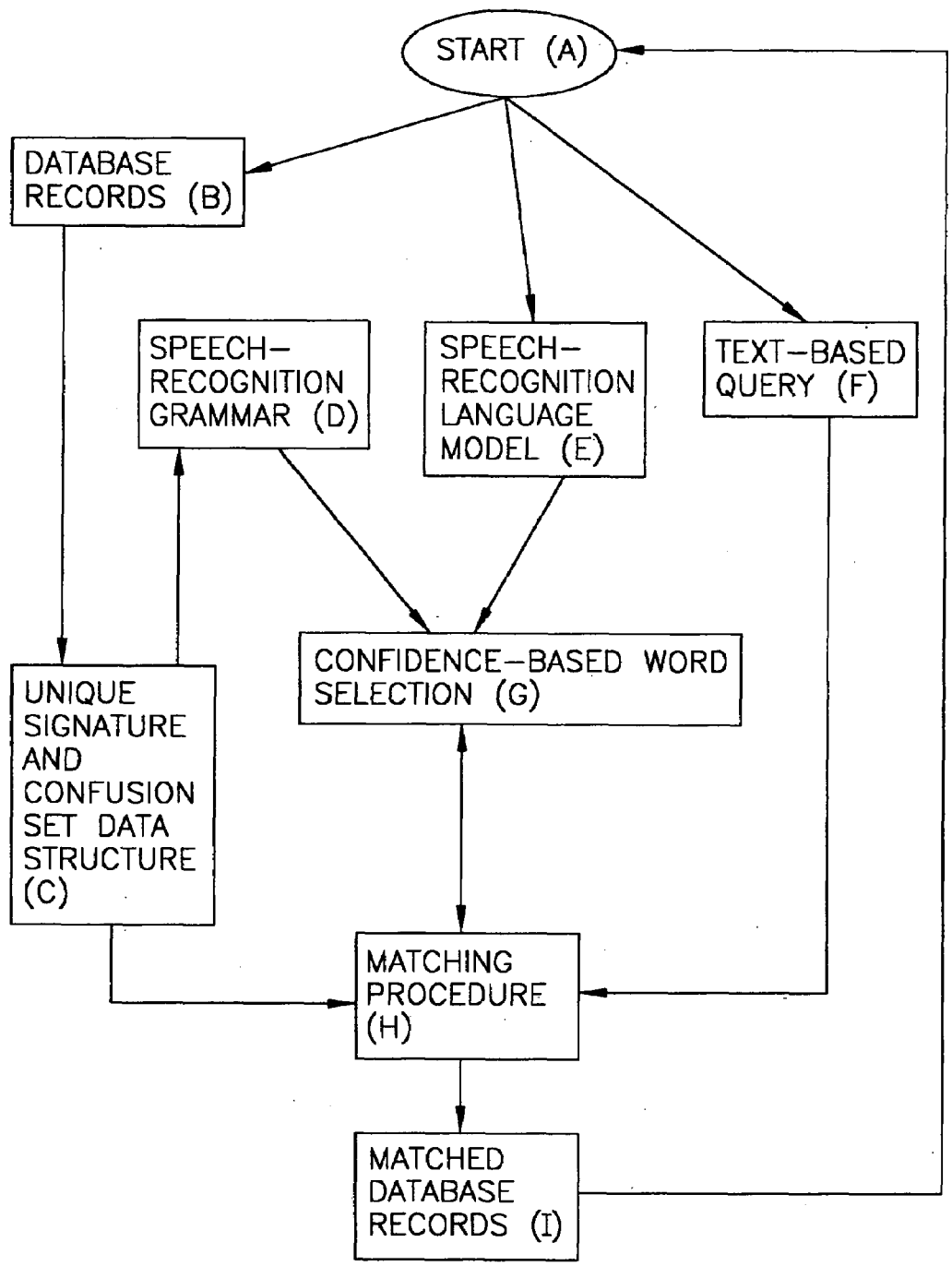
FIG. 1a is a schematic diagram illustrating a general process for facilitating database access in speech or text recognition.

FIG. 1a provides a general overview of a process as discussed above. As shown, one may begin in a start state (A) and proceed to process a database (B). From this database, a set of unique record signatures (see below) and confusion sets is preferably derived and stored in a data structure (C). Optionally, the unique signatures and confusion sets can be used to construct a speech recognition grammar (D). Alternatively, a language-model based recognizer (E) or a simple text-based query module (F) could be used to generate query words. In the case of a speech-recognition based system, the query words are preferably annotated with confidence measures and passed through a confidence-based word-selection module (G) that selects high-probability words. Query words are then preferably passed to a matching procedure (H) that finds and returns matching database records (I). Optionally, the matching module may communicate with the confidence module and request a larger number of (lower confidence) words. The matched database records can either be directly returned to the user, or returned to the start state where they can be treated as a miniature database suitable for another round of processing with the goal of removing any ambiguity so that just one record is eventually returned to the user.

The disclosure now turns to a more specific discussion of different embodiments of the present invention.

Herebelow and elsewhere throughout the present disclosure, the term "signature" is used to refer to a subsequence of the words in a listing that uniquely identifies the listing. In the example provided further above, "3-L", "Hair 3rd", and "Hair Main" are signatures. These subsequences of words are signatures because they occur in exactly one listing. Note that the words in a signature need not be consecutive in the listing.

The problem of identifying all the phrases that uniquely identify a listing can preferably be solved with the following steps:

a) Enumerate all possible n-word subsequences of, e.g., words in a listing. (The value could depend on the application at hand; for instance, in many applications n could be 3.)

b) For each subsequence, create a record containing the subsequence and the index of the listing from whence it came.

c) Sort the records into lexicographical order based on the subsequences.

d) Scan linearly over the records for cases where the associated subsequence does not occur in either the preceding or following record. Such cases thus indicate unique signatures.

In order to create a grammar that will identify uniquely specified listings, the following additional step (e) may preferably be performed: for each unique signature, add an entry to the grammar. This entry duplicates the original listing, except that all words not in the signature are made optional.

The effect of steps a-d can be appreciated from FIG. 1, particularly with respect to the example of "3-L Hair World on North 3rd Street," (database record 1) and "Suzie's Hair World on Main Street" (database record 2). As shown, a data structure after steps a and b is indicated at 102, a data structure subsequent to sorting in step c is indicated at 104 and unique signatures identified in step d, and stored in sorted order, are indicated at 106. For clarity, two-word subsequences have been used in this example, and not all of them have been enumerated. A full enumeration would require more space than is available.

Note that after step c (104), the records are lexicographically sorted, and all those with "Hair World" in the first fields have been brought together. By scanning down the records at this point, it becomes apparent that "Hair World" occurs in multiple listings and therefore is not unique. However, "3-L Hair" occurs in just one listing and is unique.

In step a, the subsequences of words were constrained to occur in the same order as in the original listing. (For example, "3-L Hair" is a subsequence, but "Hair 3-L" is not.) In is anticipated that in some applications, it will be beneficial to allow the subsequences of words taken in any order. In the examples presented here, this is not the case, but it in no way limits the scope of the present invention.

Figures 2, 3:
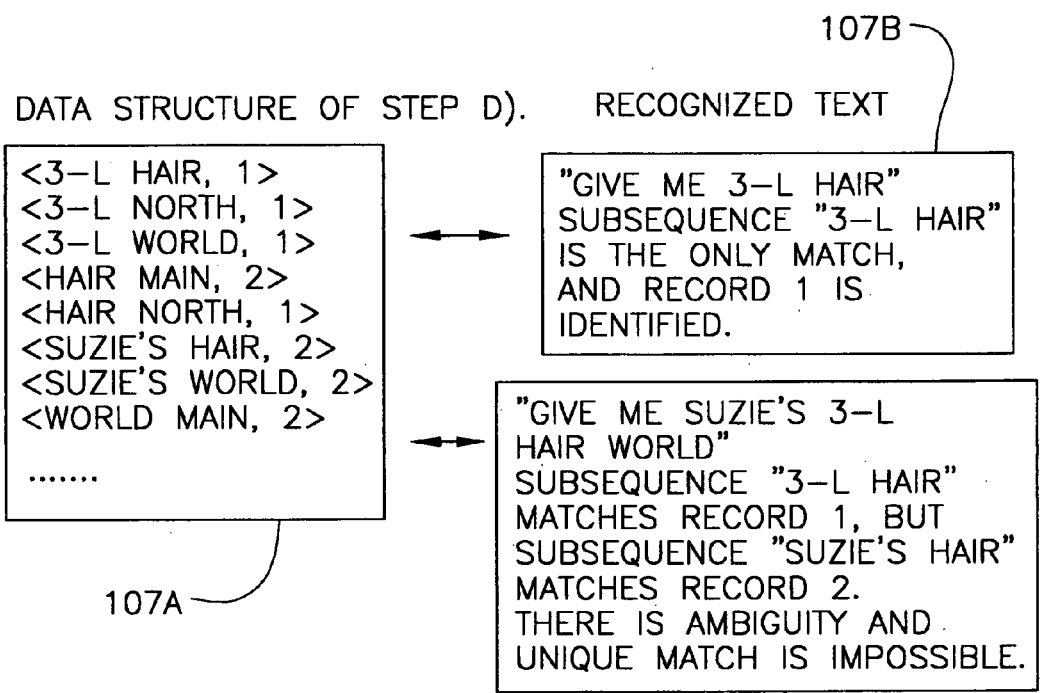
FIG. 2 shows a sample grammar constructed from unique signatures.
FIG. 3 depicts the use of language model based recognition.

FIG. 2 illustrates the grammar that results from performing the final step e mentioned above. In this representation, question marks are used to indicate optional words. The figure indicates that a sentence (denoted by <S>::=) can be realized in one of the eight ways indicated on the lines below the symbol. Each of these lines specifies a phrase in which some of the words are optional, and after the colon, each specifies the database record that should be identified. Though not of primary practical importance, in the present example lines are separated by vertical bars (1), while the grammar is terminated by a period.

FIG. 3 addresses the present invention in the context of a language model based speech recognition system. A language model based speech recognition system is covered in at least Stanley F. Chen and Joshua T. Goodman, "An Empirical Study of Smoothing Techniques for Language Modeling," Technical Report TR-10-98, Computer Science Group, Harvard University, 1998. The data structure resulting from step d is indicated at 107*a*, while different instances of text recognition are indicated at 107*b* and 107*c*. Here, the database of step c can preferably be used to identify records with the following additional steps:

I. Enumerate the possible n-word subsequences of the recognized text.

II. For each of these subsequences, do a binary search on the sorted records to see if the subsequence if listed as a unique signature.

III. If all the entries found in Step II are associated with a unique listing in the database, then an unambiguous match has been made.

It should be understood at this point that there are many variations in which the general procedure contemplated hereinabove may be applied. For example, certain common words such as "of" or "the" may be excluded from the subsequences used to define signatures. Similarly, initial text processing and normalization can be done, for example, by expanding abbreviations, or forming compound words from words that will always be said together (e.g. Red Lobster→Red-Lobster). Further, many representations of a grammar are possible. To these ends, the BNF ("Backus-Naur Form") could be used, and is actually depicted in FIG. 2. Further, there are many conceivable ways to represent a given grammar; whereas different notations may used, grammars can also be represented as finite state machines, oriented graphs, and in other manners well-known to those of ordinary skill in the art. (see Allen, J. F. Natural Language Understanding, Benjamin Cummings, 1987, Second Edition, 1994.)

The problem of precomputing the sets of records that match non-unique partial specifications can preferably be solved with the following steps:

a') Enumerate all possible n-word sub-strings (i.e. consecutive words) in a listing. (For instance, n could be 3.)

b') For each substring, create a record containing the sub-string and the index of the listing it came from.

c') Sort the records into lexicographical order on the sub-string.

d') Scan linearly over the records for cases where a single substring occurs multiple times.

e') For each such case, group the associated listings into a confusion set.

Figure 4:
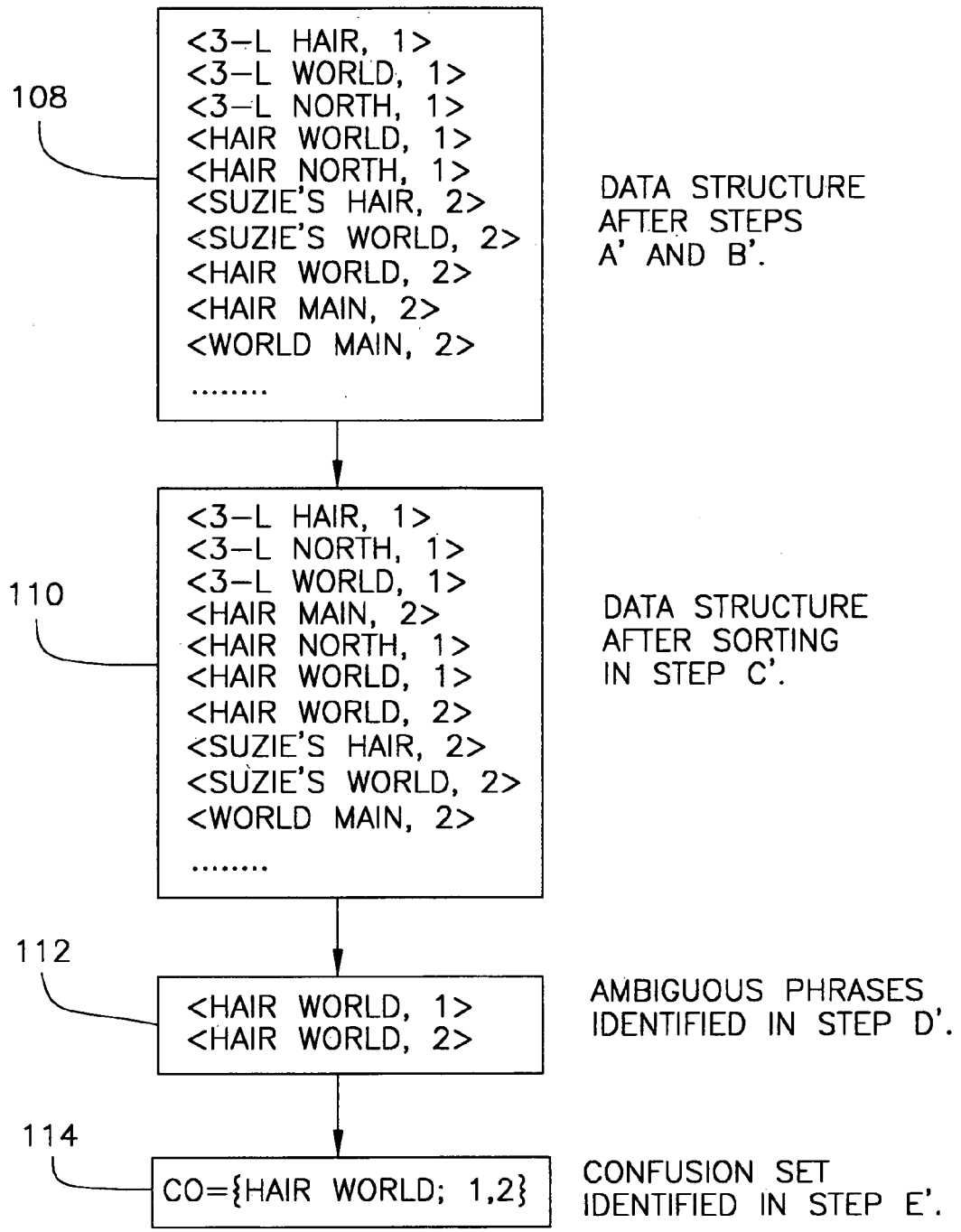
FIG. 4 is a flow diagram representing the construction of confusion sets.

FIG. 4 illustrates a data structure after steps a' and b' (108), the data structure after sorting in step c' (110), an ambiguous phrase identified in step d' (112) and a confusion set identified in step e' (114).

Steps a') through c') are essentially the same as steps a) through c) in the process for finding unique signatures. In step d'), however, multiple records with the same lexical key are identified. In step e'), a confusion set is created for each lexical key identified in step d).

If a grammar is being produced, the following additional step is preferably performed:

f) For each confusion set, add an entry to the grammar that recognizes the associated lexical key, and which returns the value of the confusion set when it is recognized.

The effect of step f' is illustrated in FIG. 5 (in similar manner to FIG. 2). In the case that the text being matched comes from a Language Model based speech recognizer, if that text is an exact match to the lexical key of a confusion set, then the confusion set is preferably identified.

It is understood that there are numerous variations on the basic idea relating to confusion sets just described, whereby under certain circumstances confusion sets may not be added to a grammar, for example, if there are too many matching records (e.g., if 1000 or more records match the phrase "pawn shop"). Similarly, a phrase identified as a confusion set might be treated specially if it is an exact match to one of the listings. (For example, if the listings "M&T Trucking" and "M&T North Carolina Trucking" are both present, the phrase "M&T Trucking" will be flagged as a confusion set. However, since it is an exact match to the first listing, special treatment may be desired.)

Turning now to confidence based extensions for speech recognition applications, it is recognized that some speech-recognition based applications, like directory assistance, can only tolerate a very low error rate. The rejection thresholds need to be set to high values in order to ensure that the user is very rarely given the wrong answer. While this solves the problem of giving a caller false information, the overall automation rate suffers because a large number of correctly recognized requests are rejected along with the incorrectly recognized ones. Often, the confidence score of the entire utterance is not high enough because just a few words do not score high. Then the entire utterance is discarded. To improve this, there is addressed herebelow the observation that even a small high confidence portion of the user utterance can still uniquely identify a specific request.

The basic idea of the confidence based extension is to remove low-confidence words from recognized text, and to use the remaining text to match against the database. A detailed description of the process follows.

The recognized utterance includes a sequence of words ($w_1$) with confidence scores ($s_1$). The entire sentence has its own confidence score (s). In the case of grammar-based decoding, the score s may not meet the minimum value for the recognition result to be accepted. The following procedure will make the best possible use of the recognized text, either to initiate a disambiguation dialog or to identify the user request. For language model based recognition, the same technique can be used.

The procedure may be illustrated with an example drawn from a directory assistance application, where the user is asking for a business listing. It may be assumed that the recognized words (with scores between 0 and 100) are: "Patrick's (20) Furniture (90) Restoration (80) on (50) twenty-third (40) street (95)"

The procedure works by setting a minimum word-level confidence threshold t, and discarding all words i with score $s_1 < t$.

For example, if t=30, one may obtain the word sequence: "Furniture (90) Restoration (80) on (50) twenty-third (40) street (95)" The matching algorithm depicted in FIG. 3 is preferably used to find business names that contain a subset of those five words in the same order. If a unique match is found, the procedure stops, the listing has been identified (only one furniture restoration business on 23rd street). Otherwise, if the number of matches is more than one: the procedure stops, and a dialog is started to further disambiguate between the matches. If the number of matches is zero, the confidence threshold is set to a lower value and the procedure is repeated. If still no matches are found, a dialog is opened for clarification.

It is understood that there are many variations on the procedure just described, in which the threshold may be dynamically adjusted, or the algorithm run several times with varying thresholds until a suitable match is discovered.

It is to be understood that the present invention, in accordance with at least one presently preferred embodiment, includes an arrangement for ascertaining a plurality of possible subsequences, an arrangement for creating a record of such subsequences, and at least one of: an arrangement for ascertaining unique signatures and an arrangement for finding multiple occurrences of a given subsequence. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of facilitating database access in speech recognition, said method comprising the steps of:
    ascertaining a plurality of possible subsequences corresponding to a database entry;
    creating a record of subsequences and their correspondence to database entries;
    at least one of:
        ascertaining unique signatures via determining whether a subsequence corresponding to a given database entry does not also correspond to at least one other database entry; and
        finding multiple occurrences of a given subsequence and grouping corresponding database entries into a confusion set; and
    at least one of:
        returning to a user the database entries corresponding to the ascertained unique signatures; and
        returning to a user the database entries in the confusion set.

2. The method according to claim 1, wherein the subsequences comprise word subsequences.

3. The method according to claim 1, wherein the database entries correspond to directory listings.

4. The method according to claim 3, wherein the directory listings correspond to telephone directory listings.

5. The method according to claim 1, further comprising:
    sorting database entries into a predetermined order;
    said method comprising said step of performing said step of ascertaining unique signatures;
    said step of ascertaining unique signatures comprising determining whether a subsequence corresponding to a given database entry does not also correspond to an adjacent database entry in the predetermined order.

6. The method according to claim 5, wherein the predetermined order corresponds to a lexicographical order.

7. The method according to claim 1, further comprising the step of creating a grammar for identifying given database entries.

8. The method according to claim 7, wherein:
    said step of ascertaining unique signatures is performed; and
    said method further comprises the step of adding an entry to the grammar corresponding to each unique signature.

9. The method according to claim 7, wherein:
    said step of finding and grouping is performed; and
    said method further comprising the step of adding, for each confusion set, an entry to the grammar that recognizes a multiply occurring subsequence and thereupon returns a confusion set value.

10. An apparatus for facilitating database access in speech recognition, said apparatus comprising:
    an arrangement for ascertaining a plurality of possible subsequences corresponding to a database entry;
    an arrangement for creating a record of such subsequences and their correspondence to database entries; and
    at least one of:
        an arrangement for ascertaining unique signatures via determining whether a subsequence corresponding to a given database entry does not also correspond to at least one other database entry; and
        an arrangement for finding multiple occurrences of a given subsequence and grouping corresponding database entries into a confusion set; and
    at least one of:
        an arrangement for returning to a user the database entries corresponding to the ascertained unique signatures; and
        an arrangement for returning to a user the database entries in the confusion set.

11. The apparatus according to claim 10, wherein the subsequences comprise word subsequences.

12. The apparatus according to claim 10, wherein the database entries correspond to directory listings.

13. The apparatus according to claim 12, wherein the directory listings correspond to telephone directory listings.

14. The apparatus according to claim 10, further comprising:
    an arrangement for sorting database entries into a predetermined order;
    said apparatus comprising said arrangement for ascertaining unique signatures;
    said arrangement for identifying unique signatures being adapted to determine whether a subsequence corresponding to a given database entry does not also correspond to an adjacent database entry in the predetermined order.

15. The apparatus according to claim 14, wherein the predetermined order corresponds to a lexicographical order.

16. The apparatus according to claim 10, further comprising an arrangement for creating a grammar for identifying given database entries.

17. The apparatus according to claim 16, wherein:
    said apparatus comprises said arrangement for ascertaining unique signatures; and
    said apparatus further comprises an arrangement for adding an entry to the grammar corresponding to each unique signature.

18. The apparatus according to claim 16, wherein:

said apparatus comprises said arrangement for finding and grouping; and an arrangement for adding, for each confusion set, an entry to the grammar that recognizes a multiply occurring subsequence and thereupon returns a confusion set value.

19. A program storage device readable by machine, tangibly embodying a program of instructions executable by the machine to perform method steps for facilitating database access in speech recognition, said method comprising the steps of:

ascertaining a plurality of possible subsequences corresponding to a database entry;

creating a record of such subsequences and their correspondence to database entries; and at least one of:

ascertaining unique signatures via determining whether a subsequence corresponding to a given database entry does not also correspond to at least one other database entry; and finding multiple occurrences of a given subsequence and grouping corresponding database entries into a confusion set; and at least one of:

returning to a user the database entries corresponding to the ascertained unique signatures; and returning to a user the database entries in the confusion set.

* * * * *